US010146673B2

(12) United States Patent
Koren et al.

(10) Patent No.: US 10,146,673 B2
(45) Date of Patent: Dec. 4, 2018

(54) SOURCE CODE CHANGE RESOLVER

(71) Applicant: SAP Portals Israel Ltd., Ra'Anana (IL)

(72) Inventors: Nir Koren, Kfar Saba (IL); Run Profesorsky, Kfar Saba (IL); Ido Itzkovich, Herzliya (IL)

(73) Assignee: SAP Portals Israel Ltd., Ra'Anana (IL)

( * ) Notice: Subject to any disclaimer, the term of this patent is extended or adjusted under 35 U.S.C. 154(b) by 440 days.

(21) Appl. No.: 14/932,513

(22) Filed: Nov. 4, 2015

(65) Prior Publication Data
US 2017/0123963 A1 May 4, 2017

(51) Int. Cl.
G06F 9/445 (2018.01)
G06F 11/36 (2006.01)
G06F 8/70 (2018.01)

(52) U.S. Cl.
CPC ............ G06F 11/3688 (2013.01); G06F 8/70 (2013.01)

(58) Field of Classification Search
CPC .............................. G06F 11/3688; G06F 8/70
See application file for complete search history.

(56) References Cited

U.S. PATENT DOCUMENTS

| 6,694,509 | B1* | 2/2004 | Stoval | G06F 11/3688 707/999.202 |
| 7,340,719 | B1* | 3/2008 | Bakerman | G06F 8/70 717/106 |
| 7,406,633 | B1* | 7/2008 | LaMan, III | G06Q 10/06 709/223 |
| 8,402,435 | B1* | 3/2013 | Spiro | G06F 8/70 717/120 |
| 8,539,282 | B1* | 9/2013 | Kabanov | G06F 11/3688 702/182 |
| 2004/0267485 | A1* | 12/2004 | Penov | G06F 11/3688 702/119 |
| 2005/0015675 | A1* | 1/2005 | Kolawa | G06F 11/3688 714/38.14 |
| 2006/0015856 | A1* | 1/2006 | Lotter | G06F 8/70 717/136 |
| 2006/0041864 | A1* | 2/2006 | Holloway | G06F 11/3688 717/124 |
| 2007/0011654 | A1* | 1/2007 | Opperman | G06F 8/70 717/122 |
| 2007/0150869 | A1* | 6/2007 | Tateishi | G06F 11/3688 717/127 |
| 2009/0138843 | A1* | 5/2009 | Hinton | G06F 8/74 717/101 |

(Continued)

Primary Examiner — Ziaul A Chowdhury
(74) Attorney, Agent, or Firm — Schwegman Lundberg & Woessner, P.A.

(57) ABSTRACT

In an example embodiment, a method of resolving source code changes is provided. It is determined whether there are any portions of source code dependent on a changed portion of source code. Then, for each portion of source code including the changed portion of source code and portions of source code dependent on the changed portion of source code, one or more pieces of metadata for the portion of source code are obtained, a danger score for the portion of source code is calculated based on the one or more pieces of metadata, an execution rule corresponding to the danger score is retrieved, and the execution rule is executed, causing a command to be executed on an external run-time component.

19 Claims, 6 Drawing Sheets

(56) References Cited

U.S. PATENT DOCUMENTS

| | | | | |
|---|---|---|---|---|
| 2010/0169874 A1* | 7/2010 | Izard | ............ | G06F 8/60 |
| | | | | 717/170 |
| 2012/0324427 A1* | 12/2012 | Provost | ............ | G06F 11/3688 |
| | | | | 717/126 |
| 2013/0339933 A1* | 12/2013 | Walters | ............ | G06F 8/70 |
| | | | | 717/131 |
| 2014/0007068 A1* | 1/2014 | Cullen | ............ | G06F 8/65 |
| | | | | 717/169 |
| 2014/0331206 A1* | 11/2014 | Abraham | ............ | G06F 11/3688 |
| | | | | 717/124 |
| 2015/0143179 A1* | 5/2015 | Desai | ............ | G06F 11/3688 |
| | | | | 714/38.1 |
| 2015/0355998 A1* | 12/2015 | Kogan-Katz | ............ | G06F 11/366 |
| | | | | 717/101 |
| 2016/0188325 A1* | 6/2016 | Blitzstein | ............ | G06F 8/71 |
| | | | | 717/101 |
| 2016/0210202 A1* | 7/2016 | Sinha | ............ | G06F 11/1469 |

\* cited by examiner

SOURCE CODE CHANGE RESOLVER

TECHNICAL FIELD

This document generally relates to systems and methods for use with continuous integration (CI) components. More specifically, this document relates to resolving source code changes.

BACKGROUND

Continuous integration (CI) in software development is part of quality control for coding computer software. It acts to reduce the time needed to get a particular functionality working while at the same time improving quality. This is accomplished by providing instant feedback of how new code affects an overall solution or system.

A CI system watches a code repository for changes to source code, as provided by source control management (SCM) components. As soon as a change to a code base is committed, the CI system builds the code and runs one or more quality tests.

With the rise in popularity of cloud computing and software-as-a-service (SaaS), code changes, when accepted, are typically available to customers immediately. This is known as Continuous Delivery. This is in stark contrast to the past, where a product lifecycle included an extensive testing period (typically both alpha and beta-testing) before being made available to customers.

The tests run on altered code every time a code change is made are pre-selected by an administrator, typically on an overall project level. Thus, for a given project, the same list of tests will be used to test every portion of code changed. This can cause long CI cycles due to irrelevant tests being performed on code sections that don't require such tests. While this was not a problem in the past, the rise of Continuous Delivery causes this to become a problem.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, an intelligent engine is utilized that listens to SCM changes, analyzes the change to determine a classification for the change, and then executes one or more rules from a mapping between rules and code change classifications. In the case of testing source code changes, the rules may specify tests that are customized for the particular classification of source code change, thus reducing or eliminating the performing of irrelevant tests, and thus speeding the CI and continuous delivery cycles, as well as reducing processor and other resource utilization during source code testing.

Furthermore, the proposed solution is robust enough so that other customized actions may be launched in addition to customized testing of source code, including, for example, sending alerts to reduce security threats.

Figure 1:
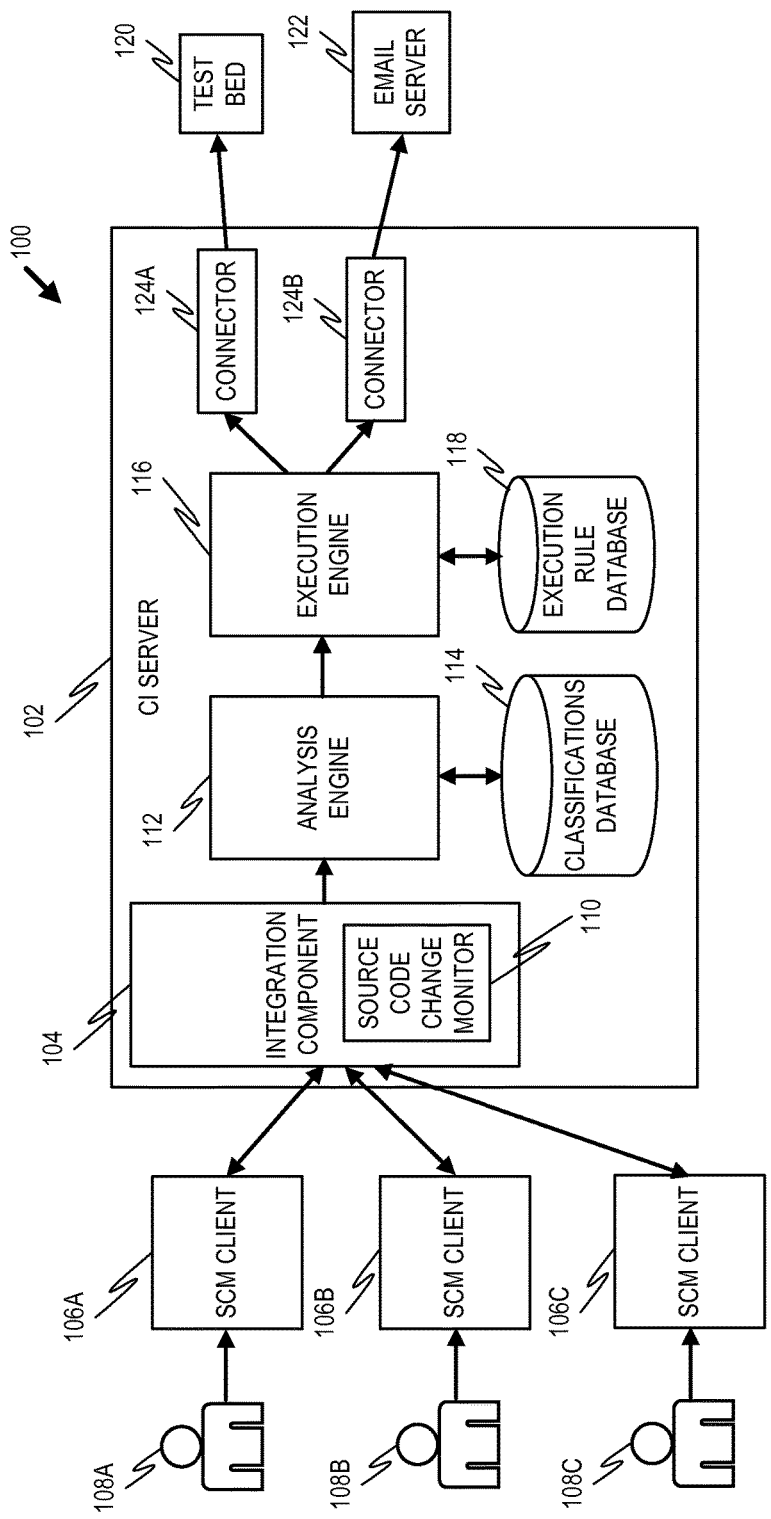
FIG. 1 is a block diagram illustrating a system, in accordance with an example embodiment, for providing continuous integration.

FIG. 1 is a block diagram illustrating a system 100, in accordance with an example embodiment, for providing continuous integration. The system includes a CI server 102. The CI server 102 includes an integration component 104. The purpose of the integration component 104 is to integrate source code changes received from one or more source code management (SCM) clients 106A-106C. A developer 108A-108C at each SCM client 106A-106C performs coding using the corresponding SCM client 106A-106C and when such coding causes changes to source code, the changes are transmitted to the integration component 104. Alternatively, the integration component 104 may include a source code change monitor 110, which actively monitors changes made to source code at the SCM clients 106A-106C.

The CI server 102 also includes an analysis engine 112. The purpose of the analysis engine 112 is to analyze the changes to the source code received at the integration component 104 to classify the changes. This analysis and the subsequent classification may be performed in a number of different ways.

In an example embodiment, metadata about the source code changes include such information as developer name (e.g., who made the changes), geographic location (e.g., where the changes were made), time stamps (e.g., when the changes were made), and file name (e.g., what extension the file the source code changes were saved in).

For user-based classification, source code changes from certain users may be labeled as requiring different testing than those from other users. For example, particular users may be more junior and it may be desirable to provide more extensive testing for source code changes from junior users than more senior users.

For geographic-based classification, a new development team from a particular geographical site may be merged into the project, and it may be desirable for source code changes from this team to get more extensive testing for source code changes than from other teams who might be more "proven". Additionally, certain geographic locations may be viewed as more potentially risky from a security point of view. For example, if the project is for a U.S. based company with only a few overseas employees in Europe, source code changes from countries such as Russia and China may be viewed as being of higher risk of potentially malicious or otherwise security threats, and thus it may be desirable that more testing be performed for source code changes from those countries, and potentially alerts being generated to senior-level employees to manually review the source code changes as well.

For time-based classification, people who commit changes between midnight and 6 AM may be less focused, and thus it may be desirable to perform additional testing for source code changes committed between those hours than those committed at other times.

For file-based classification, file type or path may be utilized to classify the source code change. For example, changes to certain types of files, such as *.sql files, might be more dangerous, either from the reliability standpoint or the security standpoint, than changes to other types of files. Additional testing may be desirable, therefore, for source code changes to particular types of files. Similar classifications can occur based on the path of the file.

Other types of metadata may also be used to perform, or at least aid in, the classification. Additionally, in an example embodiment, multiple different factors are combined to derive a calculation that is used to determine a classification for the changed source code. In one example, each of the multiple different factors is assigned a score based on the riskiness of the values for that factor. Each of these scores may then be applied a weight and the weighted scores may be aggregated into a single "danger score" for the source code change. This danger score may then be used as a classification for the source code change.

As an example, the above-described four factors (user, geographic area, time, and file type) may be assigned a score. Thus, users identified as junior may be assigned a user score of 7 while users identified as senior may be assigned a user score of 3. Likewise, Russia and China may be assigned a geographic area score of 9, whereas India and Europe assigned a score of 5 and the United States a score of 2. Likewise, a time stamp of midnight to 6 AM may be assigned a time score of 7, whereas a time stamp of any other time may be assigned a score of 3. Likewise, a file type of "sql" may be assigned a score of 8 while any other file type may be assigned a score of 3. An aggregated danger score can then be calculated using the following algorithm:

Danger Score=(0.3) user score+(0.2) geographic area score+(0.1) time score+(0.3) file type score.

Of course, the constants in this algorithm can be altered by an administrator.

Furthermore, in an example embodiment, the danger score may be dynamically calculated based on an algorithm that may itself change based on various factors. For example, in the first few weeks of launch, changes to source code may be given higher scrutiny as any sort of error or crash could be a public relations disaster, whereas later in the product lifecycle less scrutiny may be given to such source code changes. This could either be reflected in a changed algorithm (or constants) used to calculate the danger score for the changed source code, but also could be reflected in a change in the classifications of various danger scores.

The danger scores may be classified by comparison to various threshold levels. For example, a score of less than 4 may be considered to be low danger, a score of between 4 and 6 may be considered to be of moderate danger, a score of between 6 and 9 may be considered to be of high danger, and score of 9 or higher may be considered to be of extreme danger. As will be described later, a different rule set may be applied for execution to the different classifications. The classifications themselves may be stored in a classifications database 114, which, for example, may store a mapping between particular danger score ranges and particular classifications.

In an example embodiment, one or more of the factors used in the analysis engine 112 may be deduced by the analysis engine 112 rather than simply received as, for example, metadata. For example, a source code style may be deduced by comparison of snippets of the changed source code to various stored programming styles. Certain programmers and/or teams may develop certain styles that can be identified through this analysis. Thus, the analysis engine 112 may be able to deduce that the code change was written by a particular individual, even without being explicitly told this from the SCM client 106A-106C. This may be useful in cases where the SCM client 106A-106C does not record the programmer's identity or in situations where, for one reason or another, the identity may be in doubt. For example, the SCM client 106A-106C may identify a particular programmer as having coded a particular source code change, but the pattern analysis may reveal that the style of the source code change is not the same as the style typically used by the particular programmer In such a case, it may be desirable to provide more extensive testing to prevent any potential security breach.

It should be noted that while the term "changed source code" is used throughout this document, this term, and any equivalent terms, should be interpreted broadly to refer to any portion of the source code that is affected by a change. This may, of course, include portions of source code that are directly changed by a programmer, but can also include portions of source code that are only indirectly changed by a programmer, such as by being dependent on a portion of source code that is directly changed by the programmer. Thus, the analysis performed by the analysis engine 112 may include not just the classification aspects described above, but also an analysis of portions of the source code to determine which portions are dependent on which other portions (and thus which portions need to be classified when some specific portion of the source code is altered).

Once the analysis engine 112 determines a classification for the changed source code, the classification is sent to an execution engine 116. The execution engine 116 may then retrieve one or more execution rules corresponding to the classification for the particular source code portion. These execution rules may be stored in a execution rule database 118, which may store the rules in, for example, extensible markup language (XML) format or text (TXT) format. The execution engine 116 executes the one or more rules. As stated above, the solution is flexible enough for the rules to encompass any number of different potential actions. Most common may be a listing of different tests to be executed on the source code portion by a test bed 120, but other actions are possible as well, including generating an email alert to be sent by email server 122. The execution engine 116 may utilize one or more connectors 124A, 124B to communicate the actions to the other components 120, 122. The connectors 124A, 124B act to translate the information generated by the execution engine 116 or otherwise communicate with the other components 120, 122 to effectuate the execution of the desired rules. Other possible actions include creating variables, running OS jobs, running CI jobs, running database jobs, running scripts, and creating files.

It should be noted that, while a single CI server 102 is illustrated in FIG. 1, in another example embodiment, multiple CI servers can be utilized in a single system, with each CI system monitoring different SCM clients 106A-106B.

Figure 2:
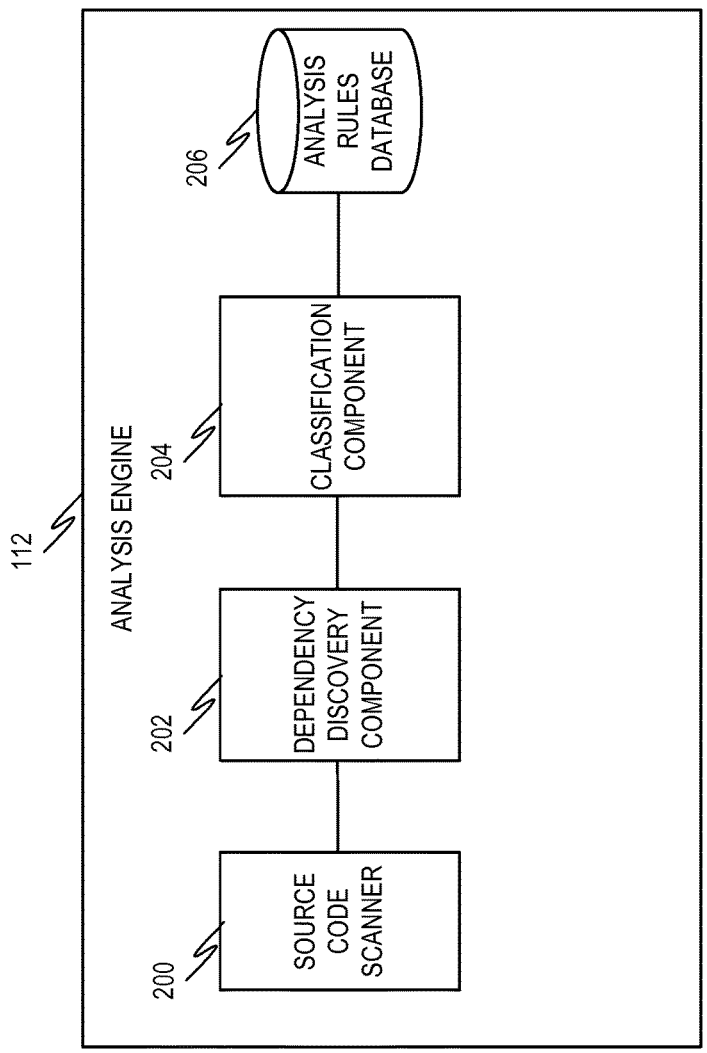
FIG. 2 is a block diagram illustrating an analysis engine, in accordance with an example embodiment, in more detail.

FIG. 2 is a block diagram illustrating an analysis engine 112, in accordance with an example embodiment, in more detail. It should be noted that while this figure and its corresponding description indicates that the analysis engine 112 is the same as the analysis engine 112 in FIG. 1, in some example embodiments, the analysis engine 112 of FIG. 2 may be used in a different system than the one depicted in FIG. 1, and nothing in this disclosure shall be interpreted as limiting the analysis engine 112 to the embodiment of FIG. 1.

The analysis engine 112 may include a source code scanner 200. The source code scanner 200 acts to scan lines of relevant source code and parse the source code. While the parsing aspect may be similar to that of a parsing function in a compiler, in example embodiments, the parsing may be at a much more basic level. Here, the ideal is to parse just enough of the source code to be able to determine (1) whether or not a change to the source code causes the system to retest the source code (e.g., whether the source code portion is one that "critical" or otherwise important enough to necessitate testing, whether the source code change is significant, etc.) and (2) any information that may be useful in calculating a danger score for the portion of the source code (e.g., pattern analysis to determine risky areas of code, verify programmer identity, etc.). As such, it is often unnecessary for the source code scanner 200 to parse the source code at a token-by-token level, but rather more broad pattern matching can be performed, such as by accessing a database of classified patterns of source code and determining whether or how closely the changed source code matches one or more patterns in the database.

A dependency discovery component 202 may then act to determine dependencies for a given changed source code portion. This process essentially involves determining if there are any other portions of the source code that need to be retested even though those other portions have not themselves changed, merely because they are dependent on the changed portion of source code currently being analyzed. This may be accomplished via a variety of different mechanisms, including dependency graph and/or dependency metric creation, gathering an analysis of various software metrics, such as cyclometric complexity, afferent and efferent coupling, relational cohesion, etc.

A classification component 204 may then act to classify each relevant portion of source code, based on the output of the source code scanner 200 and the dependency discovery component 202. Firstly, the classification component 204 may classify each relevant portion of source code as either needing to be classified or not. The relevant portions of source code include any source code that either was directly changed or any portion that is dependent on a portion of source code that was directly changed. For these, a set of rules from analysis rules database 206 may be retrieved. These rules specify various factors utilized in calculating a danger score for each relevant portion of source code. Some of these rules may be exclusionary in that they specify one or more factors or thresholds that, when present or transgressed, cause the classification component 204 to indicate the relevant portion of source code as not needing to be classified. As an example, certain types of source code may be thought of by the system as being "non-critical" and not in need of testing when altered.

Assuming that a relevant changed portion of source code exists, that relevant changed portion or portions are then classified by the classification component 204 in line with the set of rules from the analysis rules database 206, in order to calculate the danger score for each relevant changed portion of source code. These various rules were described in more detail above, with respect to FIG. 1, and thus will not be repeated at this point. The classification component 204 may then access, for example, the classifications database 114 to determine the classification for each relevant changed portion of source code based on the mappings contained therein.

Figure 3:
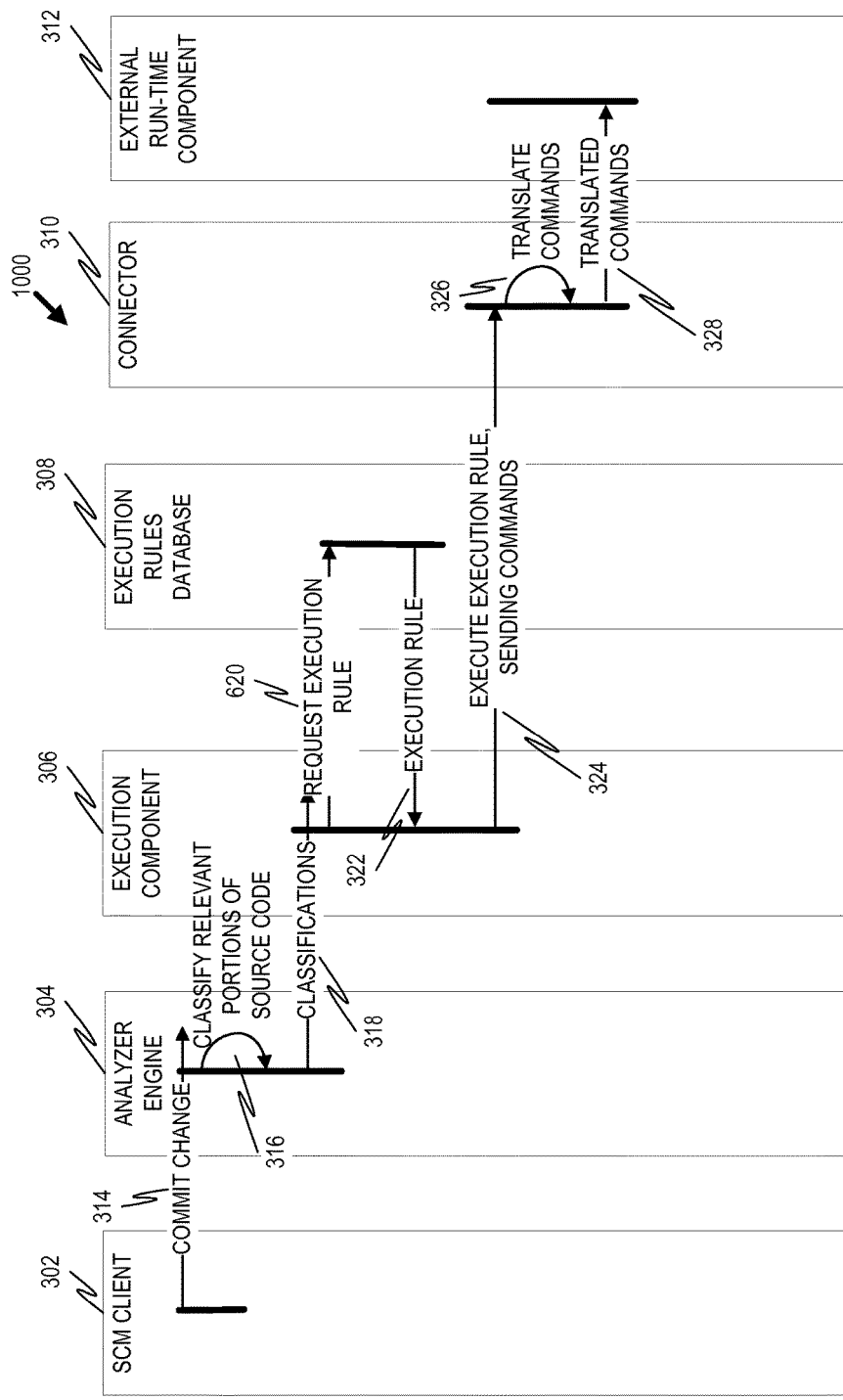
FIG. 3 is an interaction diagram illustrating a method, in accordance with an example embodiment, of resolving a change to source code.

FIG. 3 is an interaction diagram illustrating a method 1000, in accordance with an example embodiment, of resolving a change to source code. In an example embodiment, the method 1000 utilizes an SCM client 302, analyzer engine 304, execution component 306, execution rules database 308, connector 310, and external run-time component 312. At operation 314, the SCM client 302 commits a change to a portion of source code, which transmits the change to the analyzer engine 304. At operation 316, the analyzer engine 304 analyzes the changed portion of source code to classify the changed portion of source code and any portion of source code dependent on the changed portion of source code. At operation 318, these classifications are passed to the execution component 306 which, at operation 620, requests an execution rule corresponding to each classification. At operation 322, the execution rules database 308 returns an execution rule corresponding to each classification. At operation 324, the execution component 306 executes each returned execution rule, which then causes one or more commands to be passed to connector 310. At operation 326, the connector 310 translates the one or more commends and at operation 328 sends them to the external run-time component 312, such as a test bed 120 or email server 122 for execution.

Figure 4:
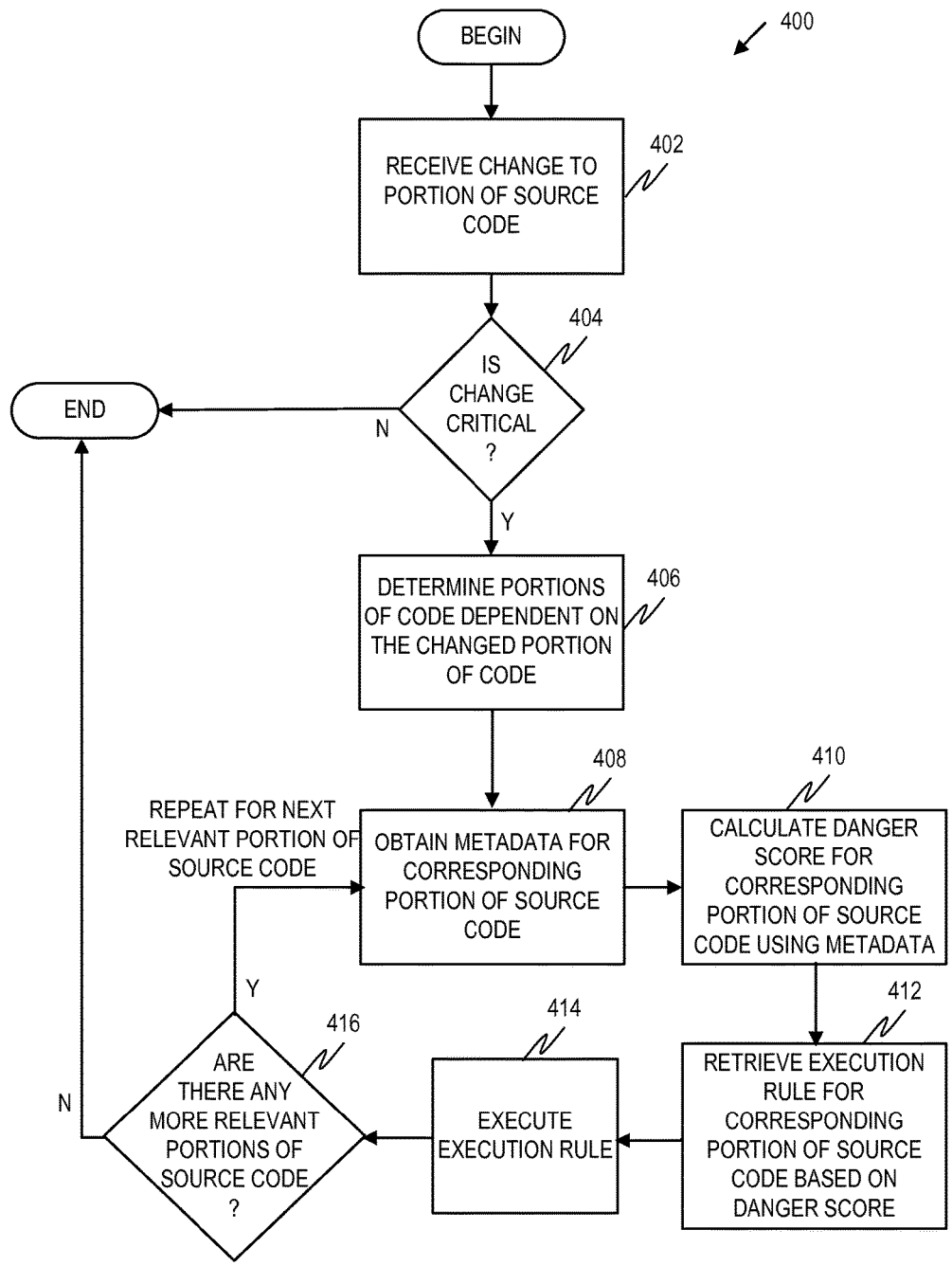
FIG. 4 is a flow diagram illustrating a method, in accordance with an example embodiment, of resolving a change to source code.

FIG. 4 is a flow diagram illustrating a method 400, in accordance with an example embodiment, of resolving a change to source code. At operation 402, a change to a portion of source code is received. At operation 404, it is determined if the changed portion of source code is critical. The term "critical" as used herein is not intended to imply any particular level of importance of the change, but rather is used to signify that predetermined level of importance, whatever that predetermined level, has been transgressed. Thus, for example, it is possible for a changed portion of source code to be considered "critical" even if its absolute importance level is quite low.

If it is determined that the changed portion of source code is not critical, then the method 400 ends. If, however, it is determine that the changed portion of source code is critical then, at operation 406, it is determined if there are any portions of code dependent on the changed portion of source code. The combination of the changed portion of code and any portion of source code dependent on the changed portion of source code results in a group of what is termed "relevant portions of source code."

A loop is then begun for each of the relevant portions of source code. At operation 408, metadata for the corresponding portion of source code is obtained. This metadata may include, for example, identity of the programmer who coded the change, time the change was committed, geographic location the change was committed, and file type in which the change was committed. At operation 410, a danger score is calculated for the corresponding portion of source code based, at least in part, on the metadata. This danger score calculation may utilize any one or more of the pieces of metadata obtained in operation 408. In an example embodiment, other factors may also be used, such as independent verification of the programmer's identity (via, for example, analysis of programming patterns), or pattern analysis to determine inherently dangerous patterns of coding. In some example embodiments, a set of rules may be used to perform this calculation. At operation 412, an execution rule is retrieved based on the danger score. This execution rule may be obtained by accessing a mapping between danger scores and execution rules.

At operation 414, the execution rule is executed, causing a command to be issued to an external run-time component 312. This external run-time component 312 may be, for example, a test bed 120 or an email server 122. At operation 416, it is determined if there are any more relevant portions of source code. If not, the method 400 ends. If so, the process loops back to operation 408 for the next relevant portion of source code.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-4 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 5:
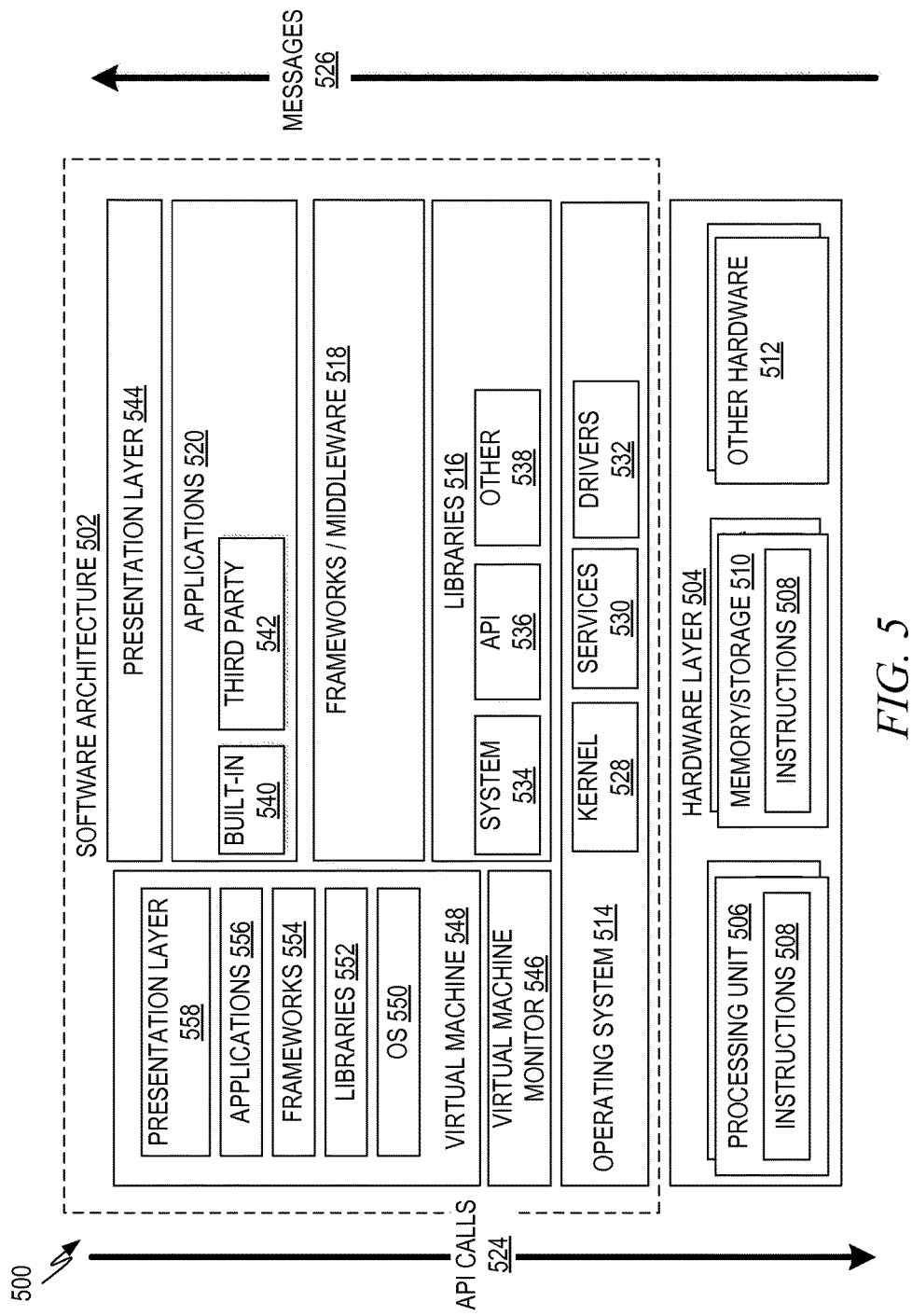
FIG. 5 is a block diagram illustrating a representative software architecture, which may be used in conjunction with various hardware architectures herein described.

FIG. 5 is a block diagram 500 illustrating a representative software architecture 502, which may be used in conjunction with various hardware architectures herein described. FIG. 5 is merely a non-limiting example of a software architecture 502, and it will be appreciated that many other architectures may be implemented to facilitate the functionality described herein. The software architecture 502 may be executing on hardware such as machine 600 of FIG. 6 that includes, among other things, processors 610, memory/storage 630, and I/O components 650. A representative hardware layer 504 is illustrated and can represent, for example, the machine 600 of FIG. 6. The representative hardware layer 504 comprises one or more processing units 506 having associated executable instructions 508. Executable instructions 508 represent the executable instructions of the software architecture 502, including implementation of the methods, modules and so forth of FIGS. 1-4. Hardware layer 504 also includes memory and/or storage modules 510, which also have executable instructions 508. Hardware layer 504 may also comprise other hardware 512 which represents any other hardware of the hardware layer 504, such as the other hardware illustrated as part of machine 600.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520 and presentation layer 544. Operationally, the applications 520 and/or other components within the layers may invoke application programming interface (API) calls 524 through the software stack and receive a response, returned values, and so forth illustrated as messages 526 in response to the API calls 524. The layers illustrated are representative in nature and not all software architectures have all layers. For example, some mobile or special purpose operating systems may not provide a frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 516 may provide a common infrastructure that may be utilized by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks/middleware 518 (also sometimes referred to as middleware) may provide a higher-level common infrastructure that may be utilized by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system 514 or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any of the built-in applications 540 as well as a broad assortment of other applications. In a specific example, the third-party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 542 may invoke the API calls 524 provided by the mobile operating system such as operating system 514 to facilitate functionality described herein.

The applications 520 may utilize built-in operating system functions (e.g., kernel 528, services 530 and/or drivers 532), libraries (e.g., system libraries 534, API libraries 536, and other libraries 538), frameworks/middleware 518 to create user interfaces to interact with users of the system. Alternatively, or additionally, in some systems, interactions with a user may occur through a presentation layer, such as presentation layer 544. In these systems, the application/module "logic" can be separated from the aspects of the application/module that interact with a user.

Some software architectures utilize virtual machines. In the example of FIG. 5, this is illustrated by virtual machine

548. A virtual machine creates a software environment where applications/modules can execute as if they were executing on a hardware machine (such as the machine 600 of FIG. 6, for example). A virtual machine 548 is hosted by a host operating system (operating system 514 in FIG. 5) and typically, although not always, has a virtual machine monitor 546, which manages the operation of the virtual machine 548 as well as the interface with the host operating system (e.g., operating system 514). A software architecture executes within the virtual machine 548 such as an operating system 550, libraries 552, frameworks/middleware 554, applications 556 and/or presentation layer 558. These layers of software architecture executing within the virtual machine 548 can be the same as corresponding layers previously described or may be different.

Example Machine Architecture and Machine-Readable Medium

Figure 6:
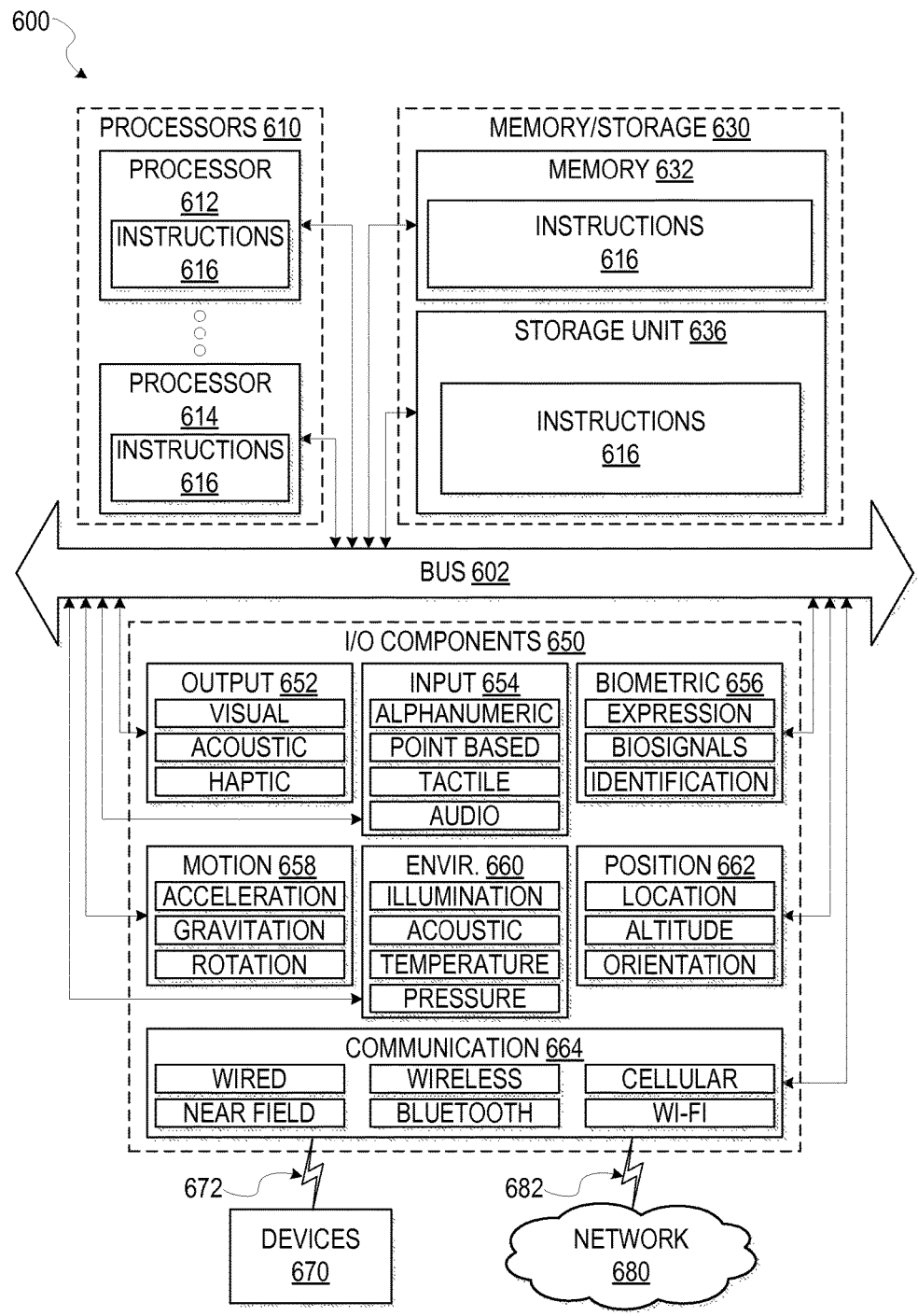
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions 616 from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application 520, an applet, an app, or other executable code) for causing the machine 600 to perform any one or more of the methodologies discussed herein may be executed. For example, the instructions 616 may cause the machine 600 to execute the flow diagrams of FIG. 4. Additionally, or alternatively, the instructions 616 may implement modules of FIGS. 1-2, and so forth. The instructions 616 transform the general, non-programmed machine 600 into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 612 and processor 614 that may execute instructions 616. The term "processor" is intended to include multi-core processor 612, 614 that may comprise two or more independent processors 612, 614 (sometimes referred to as "cores") that may execute instructions 616 contemporaneously. Although FIG. 6 shows multiple processors 610, the machine 600 may include a single processor 612, 614 with a single core, a single processor 612, 614 with multiple cores (e.g., a multi-core processor 612, 614), multiple processors 612, 614 with a single core, multiple processors 612, 614 with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor 612, 614's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions 616 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680, or a portion of the network 680, may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of resolving source code changes, the method comprising:
   accessing, at a continuous integration server, using one or processors of a machine, a change to a portion of source code stored in memory;
   determining, at the continuous integration server, if there are any portions of source code dependent on the changed portion of source code;
   for each portion of source code including the changed portion of source code and portions of source code dependent on the changed portion of source code:
   obtaining, from one or more source code management clients, one or more pieces of metadata for the portion of source code, each source code management client operating on a client device on which a different developer creates source code;
   calculating, using the one or more processors, at the continuous integration server, a danger score for the portion of source code based on the one or more pieces of metadata, the danger score indicating a probability that the portion of source code provides a security risk;
   retrieving, at the continuous integration server, an execution rule corresponding to the danger score; and
   executing, using the one or more processors, at the continuous integration server, the execution rule, causing a command to be executed on an external run-time component, wherein the continuous integration server further comprises a plurality of connectors, each of the connectors corresponding to a different external run-time component and providing translation of commands indicated by the execution rule into commands executable by a corresponding external run-time component.

2. The method of claim 1, wherein the external run-time component is a test bed.

3. The method of claim 1, wherein the external run-time component is an email server.

4. The method of claim 1, wherein the one or more pieces of metadata include an identity of a programmer who programmed the change to the portion of source code.

5. The method of claim 1, wherein the one or more pieces of metadata include a time the change was made.

6. The method of claim 1, wherein the one or more pieces of metadata include a geographic location where the change was made.

7. The method of claim 1, wherein the one or more pieces of metadata include a type of a file in which the change was made.

8. A system comprising:
   a continuous integration server comprising:
   one or more processors;
   an integration component executable by the one or more processors and configured to receive a change to a portion of source code;
   an analysis engine executable by the one or more processors and configured to determine if there are any portions of source code dependent on the changed portion of source code and, for each portion of source code including the changed portion of source code and portions of source code dependent on the changed portion of source code, obtain one or more pieces of metadata for the portion of source code from a source code management client, each source code management client operating on a client device on which a different developer creates source code, and calculate a danger score for the portion of source code based on the one or more pieces of metadata, the danger score indicating a probability that the portion of source code provides a security risk; and
   an execution component executable by the one or more processors and configured to, for each portion of source code including the changed portion of source code and portions of source code dependent on the changed portion of source code, retrieve an execution rule corresponding to the danger score and execute the execution rule, causing a command to be executed on an external run-time component, wherein the continuous integration server further comprises a plurality of connectors, each of the connectors corresponding to a different external run-time component and providing translation of commands indicated by the execution rule into commands executable by a corresponding external run-time component.

9. The system of claim 8, wherein the integration component includes a source code change monitor executable by the one or more processors and configured to actively monitor changes to source code occurring on one or more source code management clients.

10. The system of claim 8, wherein the analysis engine comprises:
- a source code scanner configured to scan lines of relevant source code and parse the source code;
- a dependency discovery component configured to determine dependencies for a given source code portion;
- a classification component configured to classify each relevant portion of source code, based on output of the source code scanner and the dependency discovery component using a mapping contained in a classifications database.

11. The system of claim 8, wherein the external run-time component is a test bed.

12. The system of claim 8, wherein the external run-time component is an email server.

13. A non-transitory computer-readable storage medium comprising instructions that, when executed by at least one processor of a machine, cause the machine to perform operations comprising:
- accessing, at a continuous integration server, using one or processors of a machine, a change to a portion of source code stored in memory;
- determining, at the continuous integration server, if there are any portions of source code dependent on the changed portion of source code;
- for each portion of source code including the changed portion of source code and portions of source code dependent on the changed portion of source code:
  - obtaining, from one or more source code management clients, one or more pieces of metadata for the portion of source code, each source code management client operating on a client device on which a different developer creates source code;
  - calculating, using the one or more processors, at the continuous integration server, a danger score for the portion of source code based on the one or more pieces of metadata;
- retrieving, at the continuous integration server, an execution rule corresponding to the danger score, the danger score indicating a probability that the portion of source code provides a security risk; and
- executing, using the one or more processors, at the continuous integration server, the execution rule, causing a command to be executed on an external run-time component, wherein the continuous integration server further comprises a plurality of connectors, each of the connectors corresponding to a different external run-time component and providing translation of commands indicated by the execution rule into commands executable by a corresponding external run-time component.

14. The non-transitory computer-readable storage medium of claim 13, wherein the external run-time component is a test bed.

15. The non-transitory computer-readable storage medium of claim 13, wherein the external run-time component is an email server.

16. The non-transitory computer-readable storage medium of claim 13, wherein the one or more pieces of metadata include an identity of a programmer who programmed the change to the portion of source code.

17. The non-transitory computer-readable storage medium of claim 13, wherein the one or more pieces of metadata include a time the change was made.

18. The non-transitory computer-readable storage medium of claim 13, wherein the one or more pieces of metadata include a geographic location where the change was made.

19. The non-transitory computer-readable storage medium of claim 13, wherein the one or more pieces of metadata include a file type of a file in which the change was made.

* * * * *